May 14, 1946.    C. E. HOFBAUER    2,400,418
PRESSURE CONTROL FOR HYDRAULIC SYSTEMS
Filed Oct. 9, 1941
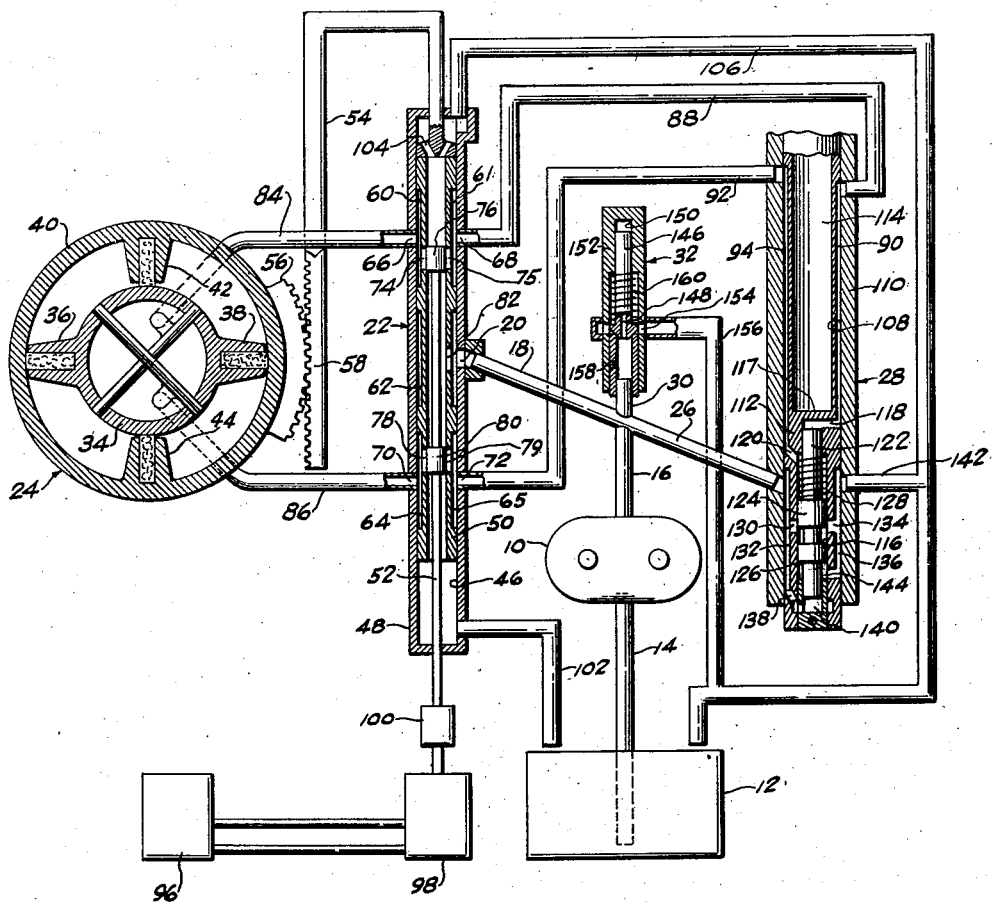
INVENTOR
Caspar E. Hofbauer
BY
Harris G. Luther
ATTORNEY Patented May 14, 1946

2,400,418

UNITED STATES PATENT OFFICE 2,400,418

PRESSURE CONTROL FOR HYDRAULIC SYSTEMS

Caspar E. Hofbauer, Hartford, Conn., assignor to United Aircraft Corporation, East Hartford, Conn., a corporation of Delaware Application October 9, 1941, Serial No. 414,316

5 Claims. (Cl. 60—52)

This invention relates to improvements in fluid pressure control means for a pressure fluid hydraulic system and has particular reference to an improved pump outlet pressure control valve for a hydraulic system including a fluid motor, a pump for supplying hydraulic fluid under pressure to operate the motor and a double-acting valve for controlling the application of the hydraulic fluid under pressure to the motor.

An object of the invention resides in the provision of a pressure controlling valve of the character indicated which will, during motor operation, maintain the pump outlet pressure above the fluid pressure required to operate the motor.

A further object resides in the provision of an improved pressure control valve of the character indicated hydraulically connected with both sides of the double-acting valve in such a manner that it functions to maintain the pump outlet pressure above the pressure required to operate the hydraulic motor regardless of the position of the motor control valve.

A still further object resides in the provision of a pump outlet pressure control valve of the character indicated which is operative during motor operation to maintain the pump outlet pressure above the pressure required to operate the hydraulic motor and which will by-pass the pump at low pressure when the motor is not operating.

Other objects and advantages will be more particularly pointed out hereinafter or will become apparent as the description proceeds.

In the accompanying drawing, in which like reference numerals are used to designate similar parts throughout, there is diagrammatically illustrated a suitable mechanical embodiment for the purpose of disclosing the invention. The drawing, however, is for the purpose of illustration only and is not to be taken as limiting or restricting the invention since it will be apparent to those skilled in the art that various changes in the illustrated embodiment may be resorted to without in any way exceeding the scope of the invention.

In the drawing, the single figure is a diagrammatic illustration of a hydralic system including a pump and a pump outlet pressure control valve constructed according to the invention.

While the improved pressure regulating valve may be used in any hydraulic system having a double-acting motor and a double-acting valve for controlling the motor, the improved valve has been found to have particular utility in a hydraulic system used for controlling the pitch of an aeronautical propeller since it is extremely simple in construction and light in weight and, when utilized in a propeller combination, acts to conserve the power of the propeller driving engine by unloading the pitch changing pump at a pressure only slightly above the pressure required at any time to operate the pitch changing motor or motors.

Referring to the drawing in detail, the pump 10 which may be driven by an aircraft power plant comprising an engine and an engine driven propeller, or which may be driven by other suitable means, withdraws fluid from a sump or reservoir 12 through an intake channel 14 and forces this fluid through a suitable outlet channel as diagrammatically shown at 1 to a junction having three branch conduits 18, 26 and 30, conduit 18 leads to the centrally located pressure port 20 of a motor control valve, generally indicated at 22, which controls the flow of fluid to and from the hydraulic motor, which may be a propeller pitch changing motor, generally indicated at 24.

The branch conduit 26 leads from the junction in the pump outlet channel 16 to the unloading valve, generally indicated at 28, which acts to limit the pressure created by the pump to an amount slightly in excess of that required to operate the fluid pressure actuated motor 24, and the second branch conduit 30 leads from the junction in channel 16 to the safety valve, generally indicated at 32.

In the illustrated construction, the motor 24 is a vane type motor having a relatively fixed inner part 34 provided with diametrically opposed lateral vanes 36 and 38 and an outer part 40 rotatable relatively to the part 34 and provided with diametrically opposed internal vanes 42 and 44 positioned between the vanes 36 and 38.

The valve 22 has a cylindrical bore 46 formed in a body, such as the casing 48, and containing a slidable sleeve or tubular plunger 50 and a control plunger 52 reciprocable in the bore of the sleeve. The valve sleeve 50 is operatively connected with the rotatable outer motor portion 40 by suitable means as diagrammatically indicated by the link 54, gear segment 56 and tooth rack element 58, which may be integral with the link 54 or secured thereto.

This valve sleeve 50 has a centrally located external annular groove 62 overlying the pressure port 20, a longitudinal channel 60 overlying the port 66 in the casing 48, a similar channel 61 separated from the channel 60 overlying the port 68 in the casing, a channel 64 overlying the port 70 in the casing and a similar channel 65 overlying the port 72 in the casing and separated from the channel 64. A port 74 leads from the interior of the sleeve 50 to the channel 60 and a similar port 75 leads from the interior of the sleeve to the channel 61. Both of these ports are controlled by the end piston 76 of the control plunger 52. A port 78 leads from the interior of the sleeve to the channel 64 and a similar port 79 leads from the interior of the sleeve to the channel 65 and both of these ports are controlled by the piston 80 on the control plunger. A port 82 leads from the interior to the exterior of the sleeve 50 within the groove 62 and is positioned between the pistons 76 and 80 of the control plunger. The port 66 is connected with one side of the motor 24 by a fluid channel 84 and the port 70 is connected with the opposite side of the fluid motor by a similar channel 86. To allow for relative movement of the motor portion 40 and the channels 84 and 86, these channels may incorporate transfer joints or flexible connections well known in the art, or they may connect directly with the fixed inner member 34. The port 68 is connected by fluid channel 88 with a passage 90 leading to the pressure relief or unloading valve 28, and the port 72 is connected by a channel 92 with a separate passage 94 leading to a pressure relief or unloading valve. The position of the plunger 52 may be controlled by suitable control apparatus which may include a governor, such as a propeller or engine driven governor now well known in the propeller art and diagrammatically indicated at 96 and a servo-motor diagrammatically indicated at 98 operatively connected with the control plunger 52 by a suitable connection which may include a slip joint 100 having relatively rotatable parts. The servo-motor 98 may be also controlled by suitable manually operable means if desired.

For a more detailed description of suitable control mechanism reference may be had to United States application Serial No. 422,252, filed December 9, 1941, by Perin and Richmond, for Propeller control means, and assigned to the assignee of this invention and United States Patent Number 2,145,859, issued February 7, 1939, to Frank W. Caldwell for Control means for controllable propellers, and United States Patent Number 2,163,663, issued June 27, 1939, to Frank W. Caldwell for Controllable-pitch propeller.

The operation of the motor and its control valve is substantially as follows:

Assuming that the plunger 52 is moved upwardly as viewed in the accompanying drawing, the port 74 will be connected with the pressure port 82 admitting fluid under pressure from the pump outlet through the channel 60 and the channel 84 to one side of the motor 24 and port 75 will be connected through the channel 61 and channel 88 to the valve passage 90. At the same time the piston 80 of the control plunger will connect the ports 78 and 79 with the open end of the sleeve 50 connecting the channels 64 and 65 with the sump 12 through the end of the valve casing 48 and the drain channel 102 thus connecting the opposite side of the motor and the valve passage 94 with the sump. Because one side of the motor 24 is connected with the fluid from the pump outlet and the opposite side is vented to drain the outer portion 40 of the motor will now tend to rotate relative to the fixed inner portion 34. A description of the action of movable sleeve 50 is given hereinafter.

If the control plunger 52 were moved downwardly, as viewed in the accompanying drawing, the motor would tend to rotate in the opposite direction since in that case the channel 86 would be connected with the pump outlet and the channel 84 would be connected with the sump through the hollow end of the sleeve 50, the apertures 104 in the cap attaching the rod 54 to this sleeve, the upper end of the casing 48 and the drain channel 106.

The pump unloading or pressure relief valve 28 comprises a cylindrical bore 108 provided in a solid member such as the casing 110 within which is a fixed bushing or core member 112 having a relatively large upper bore 114 and a relatively small lower bore 116 separated from the upper bore by a transverse partition 117. The upper part of the member 112 containing the bore 114 separates the fluid passages 90 and 94 and these passages are connected with the smaller bore 116 at spaced points by suitable apertures as indicated at 118 and 120 respectively. Within the smaller bore 116 there is a reciprocable valve plunger 122 which, in the embodiment shown, has substantially the same area on each end and is provided with spaced valve pistons 124 and 126 urged by a compression spring 128 to a position in which the piston 124 separates the port 130 connected with the passage 132 from the port 134 connected with the passage 136. The pistons 124 and 126 have a cross-sectional area of just twice the cross-sectional area of the end portion of this valve plunger so that the effective areas of pistons 124 and 126 are individually equal to the area of valve plunger 122 for a purpose which will presently appear.

The branch conduit 26 leading from the pump outlet is connected with the passage 132 which is in turn connected by a suitable aperture 138 with a space 140 below the lower end of the plunger 122 so that the pressure of the fluid at the pump outlet transmitted through the channel 26, the passage 132 and the aperture 138 tends to lift the plunger 122 against the force of the spring 128 and connect the port 130 and 134 thus connecting the passages 132 and 136 which will in turn connect the channel 26 with the drain channel 142 and return some portion of the pump output to the sump 12. The space immediately below the piston 126 is connected with the passage 136 through a port 144 to prevent trapping of fluid in this space and the pressure of the fluid flowing through the ports 130 and 134 is balanced between the pistons 124 and 126 so that there is no tendency for the fluid flowing through the valve to tend to open or close the valve. The aperture 118 connects the passage 90 with the space at the upper end of the plunger 122 while the aperture 120 connects the passage 94 with the space immediately above the piston 124 so that the pressure of the fluid in the passages 90 and 94 acts on the plunger in opposition to the pressure of the fluid in the passage 132 acting on the bottom end of the plunger. The spring 128 also acts in the same direction as the pressure of the fluid in the passages 90 and 94 so that a pressure in the passage 132 sufficient to raise the plunger and vent the pump outlet must be equal to the pressure in the passage 90 plus the pressure in the passage 94 plus the pressure necessary to overcome the force of the spring 128. As the fluid in the passages 90 and 94 act on equal areas of the plunger 122 the fluid inlet pressure to the motor 24 and the back pressure of the fluid exhaust from the valve will have the same effect on the pressure relief valve regardless of the position of the valve plunger 52 and the direction of rotation of the motor.

Because of its movement by the motor the hollow valve sleeve 50 moves to cut off the supply of pressure fluid to the motor when the motor has rotated an amount corresponding to the extent of the displacement of the plunger 52 by its control mechanism. As soon as the supply of fluid under pressure to the motor from the pump has been cut off by this movement of the sleeve 50 the pressure in the channels 88 and 92 is gradually reduced and equalized by leakage through the valves 22 and 28 until the pressure in these channels has no substantial effect in maintaining the valve 28 closed. The only force to be overcome then to open the valve is the force of the spring 128 so that with the motor 24 not operating, the pump will be unloaded to substantially the pressure determined by the valve closing force of this spring. If the motor tends to move without a movement of the plunger 52 the sleeve 50 will be moved to reopen the fluid passages in a manner to supply fluid under pressure to the motor to return it to its original position and, as soon as fluid pressure is supplied to the motor an additional closing force will be exerted on the valve 28 and the pump pressure will build up to the necessary value.

The high pressure relief valve 32 comprises a plunger 146 having an aperture 148 extending longitudinally therethrough and reciprocably mounted in a bore 150 provided in a solid member such as the casing 152. One end of the bore 150 is closed and the opposite end is connected with the end of the branch conduit 30 and intermediate the length of the bore ports 154 lead to a drain line 156. The end of the plunger 146 adjacent the channel 30 is shaped to form a valve which cooperates with a valve seat 158 separating the branch channel 30 from the port 154. The pressure fluid can flow through the aperture 148 to the space between the end of the plunger 146 and the closed end of the bore 150 so that the same fluid pressure acts on the opposite ends of the plunger. The valve seat end of the plunger, however, has a somewhat greater area than the opposite end so that the resultant fluid pressure tends to open the valve. The plunger is urged to valve closing position by a compression spring 160 which may be made relatively light because of the balancing effect of the fluid pressure on the end of the plunger opposite the valve. This spring will maintain the valve closed until the maximum safe fluid pressure at the pump outlet is reached at which time it will open to relieve the pump outlet pressure and prevent it rising above the predetermined safe value.

While a suitable mechanical embodiment for the purpose of disclosing the invention has been illustrated in the accompanying drawing and hereinafter described, it is to be understood that the invention is not limited to the particular embodiment so illustrated and described, but that such changes in the size, shape and arrangement of the various parts thereof may be resorted to as come within the scope of the sub-joined claims.

Having now described the invention so that others skilled in the art may clearly understand the same, what it is desired to secure by Letters Patent is as follows:

1. In an hydraulic system including a double-acting fluid motor, a fluid pump for supplying fluid under pressure to operate said motor, and a double-acting valve having ports disposed between said pump and said motor for simultaneously controlling the application of fluid under pressure to, and the venting of fluid from, opposite sides of said motor, a pump outlet pressure regulating valve, means simultaneously connecting separate pressure areas at one end of said valve with the fluid under pressure being applied to, and vented from, opposite sides of said motor to bias said regulating valve to closed position in which it blocks an outlet of said pump, and means continuously connecting the other end of said regulating valve with said pump outlet to bias said regulating valve toward open position in which the valve directs fluid from said pump outlet to a vent, whereby said pump pressure will be relieved when said motor is not connected with fluid under pressure and the pressure at said one end of said regulating valve is relieved, and said outlet will be blocked when fluid under pressure is being supplied to said motor.

2. In an hydraulic system including a double-acting fluid motor, a pump for supplying fluid under pressure to operate said motor and a pump outlet pressure regulating valve, means biasing said pressure regulating valve toward closed position in which it blocks an outlet of said pump, a double-acting controlling valve having ports disposed between said pump and said motor and ports disposed between said pump and said regulating valve for simultaneously connecting a pressure area at one side of said regulating valve and one side of said motor with the same fluid under pressure, and connecting a second pressure area at said one side of said regulating valve and the opposite side of said motor with the same vent and for disconnecting said valve and said motor from said fluid under pressure and said vent, pressure applied to said one side of said regulating valve assisting said means in biasing said regulating valve to closed position, and means continuously connecting the other end of said regulating valve to said pump outlet to bias said regulating valve toward open position in which said regulating valve directs fluid from said outlet to a vent, whereby said pump pressure will be relieved through said outlet when said motor is not connected with fluid under pressure and the pressure at said one end of said regulating valve is relieved and said outlet will be blocked when fluid under pressure is being supplied to said motor.

3. In a hydraulic system including a double-acting fluid motor, a pump for supplying hydraulic fluid under pressure to operate said motor, and a double-acting valve between said pump and said motor for controlling the admission of hydraulic fluid to and the venting of hydraulic fluid from said motor, a fluid pressure regulating valve comprising, a valve sleeve, a plunger reciprocable in said sleeve having at one end thereof two equal transverse areas and a transverse area at the opposite end and means urging said plunger toward said opposite end, separate fluid passages leading to the spaces in said valve sleeve bounded respectively on one side by said equal transverse areas on said plunger, means connecting said passages with said motor control valve to apply the motor operating fluid pressure to one of said areas and the motor exhaust pressure to the other of said areas when the motor is operating and to relieve said pressures when said motor is inactive, a third passage in said valve sleeve leading to a space bounded on one side by said transverse area at the opposite end of said plunger, means connecting said third passage with the outlet of said pump, a fourth passage leading to a fluid sump, ports in said valve sleeve connecting said third passage with said fourth passage, and a piston on said plunger blocking at least one of said ports but movable to unblocking position by pressure in said third passage.

4. A pressure regulating valve for a hydraulic system including a pump and a double-acting motor comprising, a valve cylinder, a plunger movable in said cylinder by the preponderance of force applied to said plunger in one direction over that applied in the opposite direction, said plunger being urged in one direction by the fluid pressure being directed to and from both sides of said motor acting separately on said plunger on different areas on one end thereof when said motor is being operated and urged in the opposite direction by the fluid pressure of said pump acting on a third area on the other end of said plunger, and means for venting said pump, said means being closed by movement of said plunger in said one direction and opened by movement of said plunger in said opposite direction.

5. A pressure regulating device for a hydraulic system including a pump for supplying fluid under pressure to a double acting motor and to said device and a valve having one position in which it directs fluid under pressure from said pump to one side of said motor and to one area of said regulating device and also directs fluid under pressure from the other side of said motor and another area of said regulating device to a drain and having another position in which it disconnects said motor and said regulating device from both said pump and drain, said regulating device being drained by leakage in said system when so disconnected, said regulating device comprising an element movable by the preponderance of force applied to one end over the force applied to the other end of said element and movable in one direction when the preponderance is produced by the pressure of fluid directed by said valve acting separately on said substantially equal areas of said element and movable in the opposite direction when the preponderance is produced by the fluid pressure of said pump acting on a third substantially equal area opposed to said one and another areas, a vent for said pump and means controlled by said element for closing said vent by movement of said element in said one direction and opening said vent by movement of said element in said opposite direction.

CASPAR E. HOFBAUER.